United States Patent
Vasko et al.

(10) Patent No.: US 7,980,409 B2
(45) Date of Patent: Jul. 19, 2011

(54) CONSOLE LID DUAL LATCH DIFFERENTIATION

(75) Inventors: Melaina Vasko, Farmington Hills, MI (US); Doug Dawe, Farmington Hills, MI (US); Debbie Pixley, Farmington Hills, MI (US); Thomas Matthews, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 743 days.

(21) Appl. No.: 12/040,968

(22) Filed: Mar. 3, 2008

(65) Prior Publication Data
US 2009/0218840 A1    Sep. 3, 2009

(51) Int. Cl.
B65D 25/04   (2006.01)
B65D 45/16   (2006.01)
B60N 3/08    (2006.01)
B60N 3/10    (2006.01)

(52) U.S. Cl. .................... 220/326; 220/522; 220/527
(58) Field of Classification Search .................. 220/324, 220/326, 521, 522, 529, 527; 296/37.1
See application file for complete search history.

(56) References Cited

U.S. PATENT DOCUMENTS

| | | | | |
|---|---|---|---|---|
| 4,423,812 A * | 1/1984 | Sato | | 206/387.1 |
| 4,501,378 A | 2/1985 | Berfield | | |
| 4,758,694 A | 7/1988 | Burdick | | |
| 4,809,897 A * | 3/1989 | Wright, Jr. | | 224/282 |
| 5,083,680 A * | 1/1992 | Plough | | 222/142.1 |
| 5,484,092 A * | 1/1996 | Cheney | | 224/404 |
| 5,628,533 A * | 5/1997 | Hill | | 292/80 |
| 6,000,572 A * | 12/1999 | Kako et al. | | 220/522 |
| 6,129,400 A | 10/2000 | Jakubiec et al. | | |
| 6,227,371 B1 * | 5/2001 | Song | | 206/534 |
| 6,435,572 B1 | 8/2002 | Ticu et al. | | |
| 6,497,441 B1 | 12/2002 | Mahmood et al. | | |
| 6,513,354 B2 | 2/2003 | Predd et al. | | |
| 6,616,206 B2 | 9/2003 | Luginbill et al. | | |
| 6,719,343 B2 | 4/2004 | Emerling et al. | | |
| 6,866,319 B2 | 3/2005 | Hupfer | | |
| 7,172,232 B2 * | 2/2007 | Chiku et al. | | 296/24.34 |

(Continued)

OTHER PUBLICATIONS

J. Zuege; Nissan Technical Center North America, Inc., Farmington Hills, MI; photograph of console latches currently or previously in production, provided on Mar. 4, 2008; one page total.

*Primary Examiner* — Mickey Yu
*Assistant Examiner* — Niki M Eloshway
(74) *Attorney, Agent, or Firm* — Young Basile

(57) ABSTRACT

Disclosed herein are a vehicle console and a latching system for a vehicle console with dual latch differentiation. The latching system comprises at least one lid pivotally attached to the console to move between a closed position and an open position relative to the opening. First and second latches are mounted to the lid. The first latch is configured to detach the lid from the first coupling to permit the lid to move to the open position while still attached to the secondary compartment, thereby exposing the primary compartment. The second latch is configured to detach the lid from both the first coupling and second coupling to permit the lid to move to the open position, detached from the secondary compartment. The first and second latches each comprise a hand engageable contact surface and the contact surface of one of the first and second latches comprises a tactile differentiator.

20 Claims, 3 Drawing Sheets

U.S. PATENT DOCUMENTS

| | | |
|---|---|---|
| 7,237,816 B1 | 7/2007 | Singh et al. |
| 7,287,795 B1 | 10/2007 | Thomas |
| 2002/0113106 A1 | 8/2002 | Cheney |
| 2004/0217615 A1* | 11/2004 | Lindstrom et al. ......... 296/24.34 |
| 2005/0109801 A1* | 5/2005 | Mayston ...................... 222/536 |
| 2007/0039957 A1 | 2/2007 | Shulz et al. |
| 2007/0228047 A1* | 10/2007 | Pehr et al. ..................... 220/524 |
| 2009/0072565 A1* | 3/2009 | Mayne, Jr. ................. 296/24.34 |

* cited by examiner

CONSOLE LID DUAL LATCH DIFFERENTIATION

FIELD OF THE INVENTION

The present invention relates to the field of vehicle consoles and latching mechanisms for vehicle consoles.

BACKGROUND

Automotive vehicles are often equipped with a center console positioned between individual front driver and passenger seats. Center consoles are provided primarily for storage purposes and typically include a pivotally movable lid that opens up into a storage bin, which is usually sufficiently large to house music CD's, maps, keys and other loose miscellaneous items. In some instances, the center consoles are provided with more than one compartment. Latches are used in connection with consoles to secure and release the lid of the console. The latch must be lifted or pushed by the driver or passenger to unlatch and open the top of the console to gain access to the console compartment. Vehicle consoles with more than one compartment can have two latches, one over the other or side-by-side, where each latch is actuated to gain access to a different compartment in the console. Drivers must maintain visual contact with the road while driving, so accessing a console with more than one latch can be confusing. Because drivers also must maintain control of the steering wheel, the driver should be able to access a compartment within the console in as little time as possible.

SUMMARY

Embodiments of latching systems for a vehicle storage console are disclosed herein. One embodiment of the latching system is for a vehicle storage console having a primary compartment having an opening and a secondary compartment pivotally mounted to the console to permit movement into and out of the opening. The latching system comprises at least one lid pivotally attached to the console to move between a closed position and an open position relative to the opening. A first coupling is configured to releasably attach the lid to the primary compartment to restrain the lid from moving from the closed position to the open position. A second coupling is configured to releasably attach the lid to the secondary compartment so that when the lid moves from the closed position to the open position the secondary compartment is withdrawn from the opening and remains attached to the lid. First and second latches are mounted to the lid in a side-by-side configuration. The first latch is configured to detach the lid from the first coupling to permit the lid to move to the open position while still attached to the secondary compartment, thereby exposing the primary compartment. The second latch is configured to detach the lid from both the first coupling and second coupling to permit the lid to move to the open position, detached from the secondary compartment, thereby exposing the secondary compartment. The first and second latches each comprise a hand engageable contact surface and the contact surface of one of the first and second latches comprises a tactile differentiator.

Also disclosed herein are embodiments of a vehicle console. One embodiment of a vehicle console comprises a primary compartment having an opening and a secondary compartment pivotally mounted to the primary compartment to permit movement into and out of the opening. At least one lid is pivotally attached to both the primary and secondary compartments to move between a closed position and an open position relative to the opening. A first coupling is configured to releasably attach the lid to the primary-compartment to restrain the lid from moving from the closed position to the open position. A second coupling is configured to releasably attach the lid to the secondary compartment so that when the lid moves from the closed position to the open position the secondary compartment is withdrawn from the opening and remains attached to the lid. First and second latches are mounted to the lid in a side-by-side configuration, the first latch configured to detach the lid from the first coupling to permit the lid to move to the open position while still attached to the secondary compartment, thereby exposing the primary compartment. The second latch is configured to detach the lid from both the first coupling and second coupling to permit the lid to move to the open position, detached from the secondary compartment, thereby exposing the secondary compartment. The first and second latches each comprise a hand engageable contact surface and the contact surface of one of the first and second latches comprises a tactile differentiator.

BRIEF DESCRIPTION OF THE DRAWINGS

The description herein makes reference to the accompanying drawings wherein like reference numerals refer to like parts throughout the several views, and wherein.

DETAILED DESCRIPTION

In the various figures, like reference numbers refer to like parts.

Figure 1:
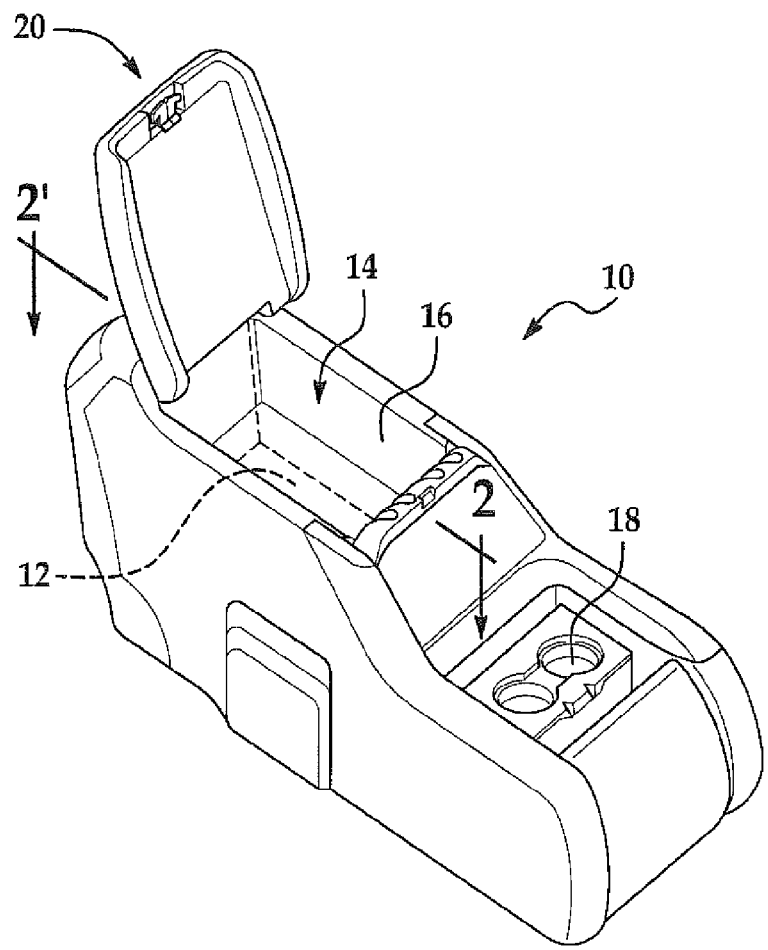
FIG. 1 is a perspective view of a vehicle console comprising an embodiment of the latching system with the dual latch differentiation.

FIG. 1 depicts an embodiment of a vehicle console 10 as disclosed herein. The vehicle console 10 can comprise a primary compartment 12 having an opening 14. A secondary compartment 16 can be pivotally mounted to the primary compartment 12 to permit movement into and out of the opening 14 of the primary compartment 12. As is typical, one or more cup holders 18 can be provided either integral with the vehicle console 10 or extending from the vehicle console 10. The vehicle console 10 can have a latching system 20 for allowing access to the primary and secondary compartments 12, 16 as well as securing any items that might be contained in the primary and secondary compartments 12, 16.

Figure 2:
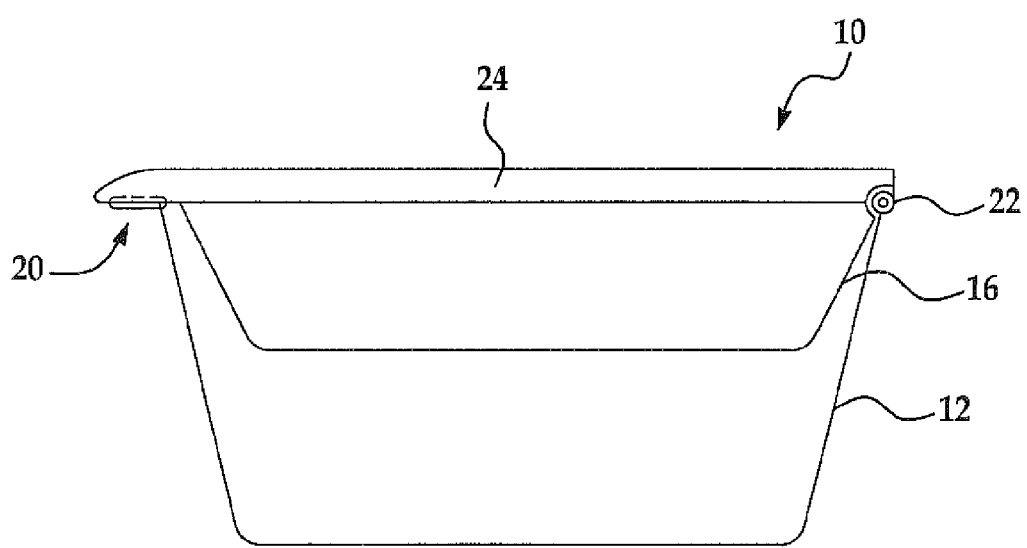
FIG. 2 is a cross-sectional view of the vehicle console along line 2-2'.

FIG. 2 is a cross-sectional view along line 2-2' and illustrates an embodiment of the vehicle console 10 with both the primary and secondary compartments 12, 16 with the secondary compartment 16 pivotally mounted to the primary compartment 12 by one or more hinges 22. The latching system 20 is in a secured position in FIG. 2. The hinge 22 is provided by way of example and not limitation, and other suitable pivotal fixtures known to those skilled in the art can be used. Alternatively, the lid can slide to expose the secondary compartment 16 and pivot with the secondary compartment 16 to expose the primary compartment 12.

The vehicle console 10 illustrated in FIG. 1 is that of a center console provided between the driver's seat and the passenger's seat. The style and location of the vehicle console 10 shown is provided by way of example and not limitation, and other suitable styles and interior vehicle locations known by those skilled in the art can be used where desired or required. For example, the vehicle console 10 can be located in the rear seating area. The primary compartment 12 can have a large volume of available storage space in relation to the secondary compartment 16, which can have a smaller volume of available space. The dimensions of the primary and secondary compartments 12, 16 are provided by way of example and not limitation, and other dimensions can be used by those skilled in the art. For example, the primary and secondary compartments 12, 16 can be side by side and either sharing a lid or each having its own lid.

Embodiments of the latching system 20 with the dual latch differentiation illustrated in FIGS. 1 and 2 are disclosed herein. Referring to FIG. 2, in one embodiment, a lid 24 can be pivotally attached to both the primary and secondary compartments 12, 16. The pivotal attachment allows the lid 24 to move between a closed position and an open position relative to the opening. The lid 24 can be pivotally attached using the same hinge or set of hinges 22 used to pivotally attach the primary and secondary compartments 12, 16. The hinge 22 is provided by way of example and not limitation, and other suitable pivotal fixtures known by those skilled in the art can be used.

Figure 3:
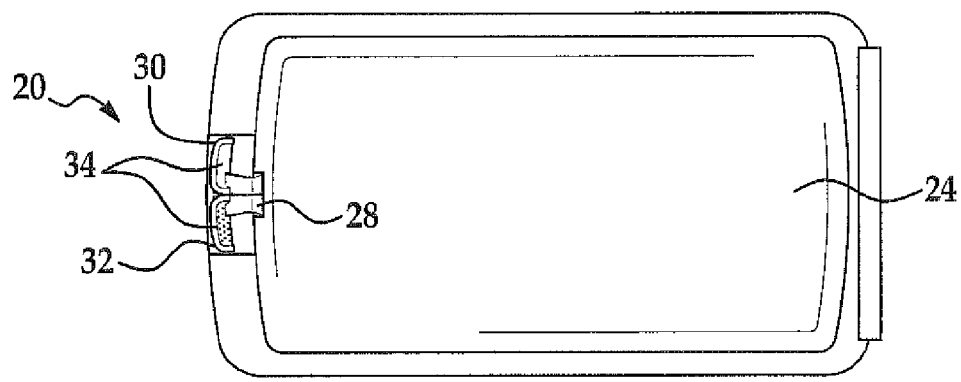
FIG. 3 is a plan view of the lid of the vehicle console comprising an embodiment of the latching system with the dual latch differentiation.

FIG. 3 is a view of the underside of an embodiment of the latching system 20 in FIG. 2. A first coupling 26 is configured to releasably attach the lid 24 to the primary compartment 12 (not shown) to restrain the lid 24 from moving from the closed position to the open position. A second coupling 28 is configured to releasably attach the lid 24 to the secondary compartment 16 (not shown). When the lid 24 moves from the closed position to the open position, the secondary compartment 16 can remain attached to the lid 24 and thus be withdrawn from the opening. The first and second couplings 26, 28 can be, for example, retaining hooks and spring releases. However, the hook and spring release are provided by way of example and not limitation, and other suitable couplings known by those in the art can be used.

First and second latches 30, 32 can be mounted to the lid 24. The first latch 30 can be configured to detach the lid 24 from the first coupling 26 to permit the lid 24 to move to the open position while still attached to the secondary compartment 16, thereby exposing the primary compartment 12. The second latch 32 is configured to detach the lid 24 from both the first coupling 26 and second coupling 28 to permit the lid 24 to move to the open position. With the lid 24 detached from the secondary compartment 16, the secondary compartment 16 is accessible. In the embodiment in FIG. 3, the first and second latches 30, 32 are mounted to the underside of the lid 24 in a side-by-side configuration. However, this configuration is provided by way of example and not limitation, and the configuration can be such that a space is between the first and second latches 30, 32. In another non-limiting example, the first and second latches 30, 32 may be configured with one over the other. The first and second latches 30, 32 may also extend directly from the side of the lid 24.

The first and second latches 30, 32 each comprise a hand engageable contact surface 34. As used herein, "hand" refers to any engagement with the contact surface by the hand, including but not limited to the palm, fingers, thumb, and fingertips. As shown in FIG. 3, the contact surface 34 is facing downward in relation to the console. In this configuration, a user can lift up by engaging their hand on the contact surface 34 of the first or second latch 30, 32 to decouple the first or second coupling 26, 28 and access either the primary or secondary compartment 12, 16. However, it is contemplated that the contact surface 34 of the first and second latches 30, 32 can face upward in relation to the console. In this manner, the user could press down by engaging their hand on the contact surface 34 of the first or second latch 30, 32 to decouple the first or second coupling 26, 28 and access either the primary or secondary compartment 12, 16. The first and second couplings 26, 28 can be recoupled by, for example, manually pressing the lid 24 in a downward direction over the opening 14 (not shown).

One of the first and second latches 30, 32 can have a tactile differentiator 36. As used herein, "tactile differentiator" means a feature on a surface that can be detected by touch to differentiate that surface from another surface. Non-limiting examples of the tactile differentiator can include bumps, indentations, straight lines, curved lines, ridges in various formations, micro-abrasions, and the like. The tactile differentiator 36 enables the driver of the vehicle to open the desired compartment without removing his or her eyes from the road. The driver can distinguish by touch between the first and second latch 30, 32 by associating either the primary or secondary compartment 12, 16 with the latch having the tactile differentiator 36. A passenger or any other user can also open the desired compartment without having to visually see which latch he or she is opening.

Figure 4:
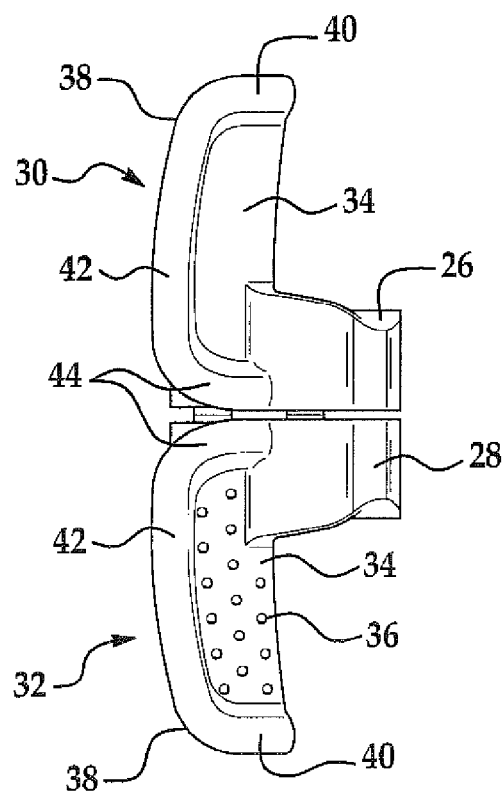
FIG. 4 is an exploded plan view of an embodiment of the latching system with the dual latch differentiation.

As shown in FIG. 4, an exploded view of the first and second latches 30, 32, the tactile differentiator 36 can be a plurality of bumps extending from the contact surface 34. The bumps can be substantially equidistant from one another and can be about 1.5 mm in diameter and about 0.75 mm in height. As shown in FIG. 4, sixteen bumps can be evenly spaced on the contact surface 34 of either latch—here, the second latch 32. However, this number is provided by way of example and not limitation, and any number of bumps can be used depending on the size of the contact surface 34 so long as the user can differentiate the bumps from a smooth surface.

Figure 5:
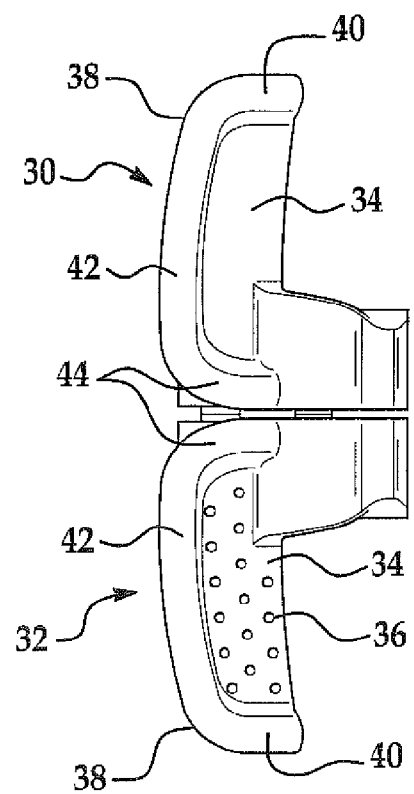
FIG. 5 is an exploded plan view of a second embodiment of the latching system with the dual latch differentiation.

A second embodiment of the vehicle console and latching system comprises all of the elements of the first embodiment described above. However, in the second embodiment, as shown in FIG. 5, the tactile differentiator 36 comprises a plurality of indentations spaced substantially equidistant from each other on the contact surface 34. The indentations can be equidistant from one another and can be about 1.5 mm in diameter and about 0.75 mm in depth. As shown in FIG. 5, sixteen indentations can be evenly spaced on the contact surface 34 of either latch—here, the second latch 32. However, this number is provided by way of example and not limitation, and any number of indentations can be used depending on the size of the contact surface 34 so long as the user can differentiate the indentations from a smooth surface.

Figure 6:
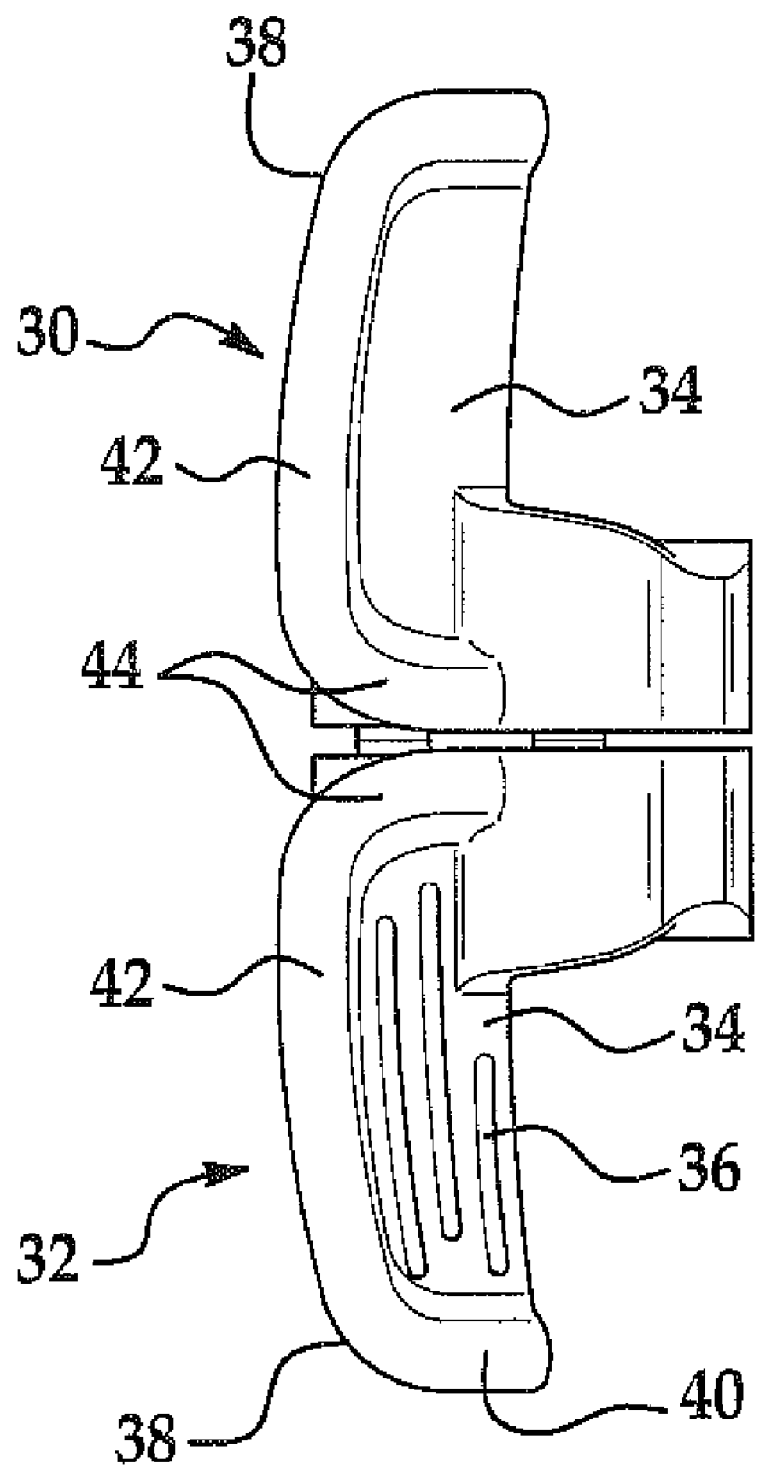
FIG. 6 is an exploded plan view of a third embodiment of the latching system with the dual latch differentiation.

A third embodiment of the vehicle console and latching system comprises all of the elements of the first embodiment described above. However, in the third embodiment, as shown in FIG. 6, the tactile differentiator 36 comprises a plurality of lines on the contact surface 34. The lines can be about 0.75 mm in depth. The length of the lines can vary depending on the size of the contact surface 34. As shown in FIG. 6, three lines can be spaced on the contact surface 34 of either latch—here, the second latch 32. However, this number is provided by way of example and not limitation, and any number of indentations can be used depending on the size of the contact surface 34 so long as the user can differentiate the lines from a smooth surface.

As seen in FIGS. 4-6, any of the disclosed embodiments can further comprise a wall 38 extending from an outer side 40 of each of the first and second latches 30, 32 and along both a front side 42 and an interior side 44 of each latch. The wall 38 can further assist the user in differentiating between the first and second latches 30, 32. The configuration of the wall 38 shown in FIGS. 4-6 is provided by way of example and not limitation and can be of a different width or height as desired or required.

The vehicle console 10 of FIG. 1 can incorporate any of the embodiments of the latching system 20 disclosed above.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A latching system for a vehicle storage console having a primary compartment having an opening and a secondary compartment pivotally mounted to the console to permit movement into and out of the opening, the latching system comprising:
    at least one lid pivotally attached to the console to move between a closed position and an open position relative to the opening;
    a first coupling configured to releasably attach the lid to the primary compartment to restrain the lid from moving from the closed position to the open position;
    a second coupling configured to releasably attach the lid to the secondary compartment so that when the lid moves from the closed position to the open position the secondary compartment is withdrawn from the opening and remains attached to the lid;
    first and second latches each mounted along an end of the lid in a side-by-side configuration, the first latch configured to detach the lid from the first coupling to permit the lid to move to the open position while still attached to the secondary compartment, thereby exposing the primary compartment; the second latch configured to detach the lid from both the first coupling and second coupling to permit the lid to move to the open position, detached from the secondary compartment, thereby exposing the secondary compartment;
    wherein the first and second latches each comprise respective first and second hand engageable contact surfaces, wherein one of the first and second contact surfaces of one of the first and second latches comprises a tactile differentiator configured to differentiate the first and second latches.

2. The latching system of claim 1 wherein the tactile differentiator comprises one or more of a plurality of bumps extending from the contact surface; a plurality of indentations spaced substantially equidistant from each other on the contact surface; and a plurality of lines on the contact surface.

3. The latching system of claim 2 wherein the bumps are about 1.5 mm by about 1.5 mm by about 0.75 mm in height and are spaced substantially equidistant from each other.

4. The latching system of claim 2 wherein the indentations are about 1.5 mm by about 1.5 mm by about 0.75 mm in depth.

5. The latching system of claim 2 wherein the lines are about 0.75 mm high.

6. The latching system of claim 1 further comprising a wall extending from an outer side of each of the first and second latches and along both a front side and an interior side of each latch.

7. The latching system of claim 1, wherein the lid has an outer surface and an underside surface, each of the first and second latches being coupled to the underside surface of the lid.

8. The latching system of claim 7, wherein each of the first and second latches is entirely positioned on the underside surface of the lid inward of the end.

9. The latching system of claim 7, wherein each of the first and second hand engageable surfaces faces away from the underside surface of the lid.

10. The latching system of claim 1, wherein each of first and second hand engageable surfaces is formed on a downward facing surface of the respective first and second latches.

11. A vehicle console comprising:
    a primary compartment having an opening;
    a secondary compartment pivotally mounted to the primary compartment to permit movement into and out of the opening;
    at least one lid pivotally attached to both the primary and secondary compartments to move between a closed position and an open position relative to the opening;
    a first coupling configured to releasably attach the lid to the primary compartment to restrain the lid from moving from the closed position to the open position;
    a second coupling configured to releasably attach the lid to the secondary compartment so that when the lid moves from the closed position to the open position the secondary compartment is withdrawn from the opening and remains attached to the lid;
    first and second latches each mounted to an end of the lid such that each of the first and second latches are at least partially concealed from a passenger view by the lid when the lid is in the closed position, the first latch configured to detach the lid from the first coupling to permit the lid to move to the open position while still attached to the secondary compartment, thereby exposing the primary compartment; the second latch configured to detach the lid from both the first coupling and second coupling to permit the lid to move to the open position, detached from the secondary compartment, thereby exposing the secondary compartment;
    wherein the first and second latches each comprise respective first and second hand engageable contact surfaces, with one of the first and second contact surfaces comprising a tactile differentiator.

12. The vehicle console of claim 11 wherein the tactile differentiator comprises one or more of a plurality of bumps extending from the contact surface; a plurality of indentations spaced substantially equidistant from each other on the contact surface; and a plurality of lines on the contact surface.

13. The vehicle console of claim 12 wherein the bumps are about 1.5 mm by about 1.5 mm by about 0.75 mm in height and are spaced substantially equidistant from each other.

14. The vehicle console of claim 12 wherein the indentations are about 1.5 mm by about 1.5 mm by about 0.75 mm in depth.

15. The vehicle console of claim 12 wherein the lines are about 0.75 mm in height.

16. The vehicle console of claim 11 further comprising a wall extending from an outer side of each of the first and second latches and along a front side and an interior side of each latch.

17. The vehicle console of claim 11, wherein the lid has an outer surface and an underside surface, each of the first and second latches being coupled to the underside surface of the lid.

18. The vehicle console of claim 17, wherein each of the first and second latches is entirely positioned on the underside surface of the lid inward of the end.

19. The vehicle console of claim 17, wherein each of the first and second hand engageable surfaces faces away from the underside surface of the lid.

20. The vehicle console of claim 11, wherein each of first and second hand engageable surfaces is formed on a downward facing surface of the respective first and second latches.

\* \* \* \* \*